United States Patent [19]

Sanchez Rodriguez

[11] Patent Number: 5,200,226

[45] Date of Patent: Apr. 6, 1993

[54] DAIRY PREPARATION AND PROCESS

[75] Inventor: José Sanchez Rodriguez, Las Palmas de Gran Canaria, Spain

[73] Assignee: Jose Sanchez Penate, S.A., Las Palmas de Gran Canaria, Spain

[21] Appl. No.: 604,886

[22] Filed: Oct. 29, 1990

[30] Foreign Application Priority Data

Jun. 13, 1990 [ES] Spain .................................. 9001640
Jun. 13, 1990 [ES] Spain .................................. 9001641

[51] Int. Cl.$^5$ ................................................ A23C 9/15
[52] U.S. Cl. ..................................... 426/585; 426/72; 426/73; 426/580; 426/602
[58] Field of Search ..................... 426/580, 585–586, 426/587, 588, 72, 73, 602, 520, 522

[56] References Cited

U.S. PATENT DOCUMENTS

| | | | |
|---|---|---|---|
| 3,011,893 | 12/1961 | Kneeland | 426/585 |
| 3,488,198 | 1/1970 | Bundus | 426/585 |
| 3,628,972 | 12/1971 | Stewart | 426/522 |
| 4,803,087 | 2/1989 | Karinen | 426/585 |
| 4,842,884 | 6/1989 | Bookwalter | 426/585 |

*Primary Examiner*—Jeanette Hunter
*Assistant Examiner*—Helen Pratt
*Attorney, Agent, or Firm*—Helfgott & Karas

[57] ABSTRACT

A dairy preparation comprising a mixture of skimmed milk with vegetable oil. The animal fat contained in the milk, rich in saturated fatty acids and cholesterol, is removed and largely replaced with oils rich in monounsaturated fatty acids, for instance olive, sunflower and peanut oils. The preparation obtained maintains all the advantage of skimmed milk and is added with vitamins A, $D_3$ and C. The process of making the dairy preparation starts with the use of liquid or powdered skimmed milk, the latter being reconstituted at a controlled temperature of at least 70° C., and then combined with a hot water-oil emulsion, the necessary and suitable amounts of vitamins A, $D_3$ and C being added. The preparation is subjected to a sudden heating at temperature 150° C. for no longer than 4 seconds.

5 Claims, 5 Drawing Sheets

DAIRY PREPARATION AND PROCESS

PURPOSE OF THE INVENTION

The present invention relates to a food product, namely a dairy preparation, whose composition is similar to that of milk, eliminating problems posed by animal fat, saturated and carrying cholesterol, enhancing its nutritional value with the addition of vegetable fat, especially comprising oils rich in monounsaturated fatty acids such as olive oil, sunflower oils, rich in oleic acid, and peanut oil, topped with vitamins A, $D_3$ and C.

The invention moreover refers to the process for obtaining such dairy preparation and the plant to bring about such process.

BACKGROUND OF THE INVENTION

It is a well-known fact that edible saturated fatty acids and cholesterol bear a negative effect upon the serum and organic content of cholesterol, whereas unsaturated acids have a beneficial effect; therefore, the action brought about by the said vegetable fats decreases the risk of suffering from cardiovascular diseases, for instance arteriosclerosis, myocardial heart attack, and affords control over problems that could lead to obesity and given preventive attention for some cancer-causing processes.

Obviously, consumption of butyric fat contained in milk and other dairy products, with a high percentage of saturated fatty acids and cholesterol, entails a greater risk, which is why the consumption of the former is recommended "skimmed".

"Skimming" milk and dairy products not only leads to their losing nutritional and vitamin value, but also to a lack of organoleptic characteristics that make them agreeable to the consumer.

DESCRIPTION OF THE INVENTION

The dairy preparation subject hereof overcomes the foregoing problems, and with a nutritional value similar to conventional "unskimmed" milk, it eliminates the latter's problems in so far as taking in saturated fatty acids and cholesterol increase in the blood is concerned, and not only without losing the nutritional, but also the vitamin and organoleptic values (taste, consistence, palatability, body, and so forth).

More specifically, the dairy preparation subject hereof is particularly characterised in replacing the classic milk's animal fat with vegetable fat, which increases ingestion of monounsaturated fatty acids and helps reduce cholesterol.

Cholesterol is carried in the human serum by lipoproteins, a known fact being that low density lipoproteins (LDL) carry between 60 and 70% of the overall cholesterol, whereas high density lipoproteins (HDL) carry somewhere round 25%.

At the liver, triglycerides join up with the cholesterol and phospholipids together with apoproteins to form the VLDL, very low density lipoproteins, which are also hydrolysed by the lipoproteinlipase to yield fatty acids and glycerol for use by peripheral tissue, whereby the VLDL not provided with triglycerides become LDL, low density lipoproteins containing some 75% of the blood's cholesterol and conveying the same toward the cells. Furthermore, the liver segregates the HDL, high density lipoproteins, that carry the cholesterol from the peripheral tissue toward the liver to be used again or eliminated. The LDL and HDL ensure cholesterol cell equilibrium, the LDL conveying it to the cells, and the HDL removing it therefrom.

In order to be able to tell the coronary risk, it is necessary to know the LDL-Cholesterol and HDL-Cholesterol value and not only the total cholesterol value.

Clinicians and epidemioligists know from experimental studies that blood cholesterol increase (hypercholesterolemia) is a factor that originates, promotes and enhances arteriosclerosis, an essential cause of the feared coronary disease (heart attack). The presence of large amounts of LDL lipoproteins in the atheromathose injury has been evidenced. LDL cholesterol deposit on the arterial wall starts up, among others, the arteriosclerosis producing mechanism; thus, LDL cholesterol (cholesterol esters joined to LDL lipoproteins) is the potentially dangerous cholesterol.

Studies would appear to show that HDL cholesterol exercises an antiatherogenic shielding function, as opposed to LDL cholesterol.

How could lipoprotein concentration be modified, how could LDL cholesterol be decreased and HDL cholesterol increased, thereby to decrease the coronary disease risk?

This essentially comprises changing our frequently cardiopernicious for a cardiohealthy life style, to which end we should:

1. Cut down on saturated fats by some 30% of the overall caloric contribution (replacing the same with unsaturated vegetable fat).
2. Put a limit on cholesterol-rich food (egg yolk, butter, animal entrails).
3. Put a limit on alcohol and tobacco consumption.
4. Exercise one's body regularly.

The dairy preparation subject hereof is envisaged for the participation of monounsaturated vegetable fat, preferably, as aforesaid, olive oil, sunflower oils rich in oleic acid and peanut oil.

The dairy preparation specifically comprises a mixture of skimmed milk and vegetable oil or fat, which mixture also contains the aforesaid oils, on their own or mixed with each other.

Such dairy preparation is topped with vitamins, preferably A, $D_3$ and C, thereby to recover those lost upon skimming, and even enhancing the nutritional value thereof.

The main advantages of this dairy preparation are the addition of vegetable oils with a high content in monounsaturated fatty acids, and the increase in its nutritional value through the addition of vitamins to such dairy preparation.

The invention also refers to the process to obtain this dairy preparation, as follows:

When the dairy preparation is manufactured from powdered milk, water is heated up to a temperature ranging between 75° and 80° C., adding powdered skimmed milk, i.e., milk from which most of the animal fat has been removed, to the same.

This step of adding the powdered skimmed milk is carried out by putting the powdered milk into a mixer and using roughly 10% of the said milk in the final mixture.

Thus reconstituted liquid skimmed milk is obtained, heated up to a temperature of around 72° to 76° C.

Where liquid skimmed milk is used in the first instance, the aforesaid reconstitution steps are done without.

A suitable vegetable fat emulsion is at the same time obtained in hot water, by means of vigorous stirring using a special stirrer and colloidal mill to achieve a highly perfect emulsion.

The vegetable fat used could be olive, sunflower or peanut oil, on their own or blended with each other, these oils being the best since they carry mostly mono-unsaturated fatty acids. Subsequently the said vegetable fat and water emulsion, at the same temperature as the reconstituted mil, in other words between 72° and 76° C., is incorporated to the latter by injection of the actual conduits through which the dairy preparation first of all goes to a static mixer and another dynamic mixer for a more homogeneous mixing of the milk and the injected fat, then going on to standardisation tanks.

At these standardisation tanks, the product contained therein is standardised and deviations corrected as to the theoretical formulation deemed to be the best, by adding such components as are most expedient.

A further two stirring operations are carried out at these standardisation tanks, a temporary and rapid operation, to homogenize the raw materials furnished to the dairy preparation as fast as possible to correct formulation thereof, and a slow and permanent operation to keep the whole mixture homogeneous.

The dairy preparation thus obtained is conveyed to storage tanks where it is also subjected to continuous stirring, and where it is maintained at a temperature of around 70° to 74° C. and from which it finally goes on to an upperization stage, which involves suddenly raising the temperature up to 150° C. for a very short space of time, not more than three or four seconds.

Finally, and after rapidly cooling the dairy preparation, it is packaged.

This process and plant yield a dairy preparation with the same nutritional value as milk, and without the problems inherent in the fat thereof.

Such dairy preparation is topped with vitamins enhancing the product's nutritional value, such preferably being vitamins A, $D_3$ and C, which are added to the storage tank or tanks just before upperisation, in order that such vitamins are unaffected upon product packaging.

Once the dairy preparation has been subjected to upperization, it is cooled down before being packaged, such cooling being achieved by passing the same through tubular coolers upstream of which treated water at room temperature is passed to be subsequently used in production blending the same with powdered milk, and because this cooling is not enough, at another cooler, exchange takes place by means of ice-cold water that lowers the dairy preparation's temperature considerably before it reaches the packaging machine.

This heat exchange with treated water, that shall later on be used in reconstituting powdered milk, as appropriate, affords considerable energy savings at the plant, for hot processing water shall be obtained with no further energy contribution to be subsequently used in other stages. Because water consumption during reconstitution does not occur at the same time as cooling of the dairy preparation, an isothermal storage tank is provided to keep the pre-heated processing water temperature.

DESCRIPTION OF THE DRAWINGS

In order to complete the description being made and to assist a better understanding of the characteristics of the invention, attached to the present specification, and integral therewith, is a set of drawings showing, merely as an example, the following.

PREFERRED EMBODIMENT OF THE INVENTION

Figure 1:
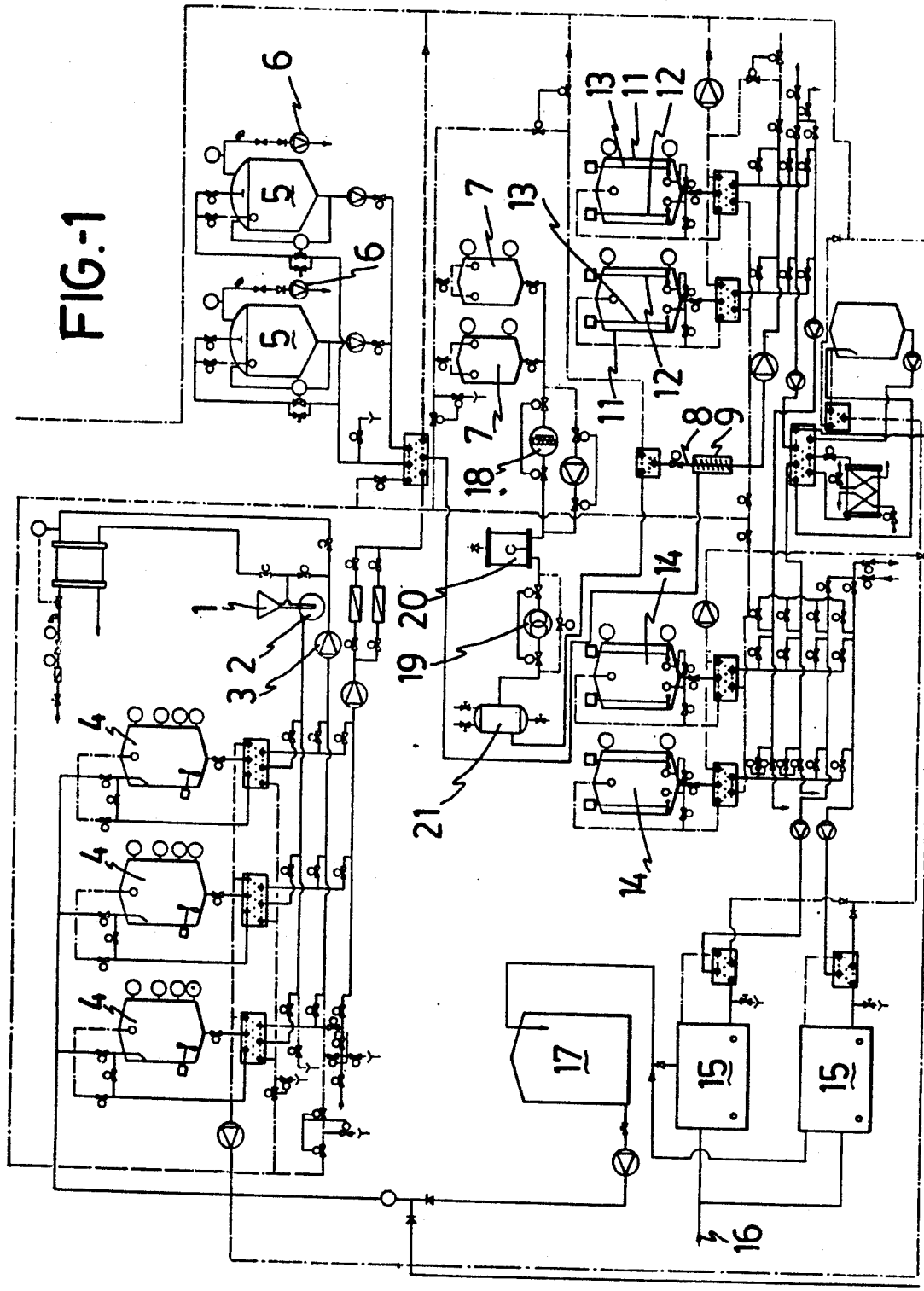
FIG. 1. Is the general layout of the plant where the preparation is obtained availing of the invention's process.

FIG. 1 shows the general layout of the plant, first of all noting the powdered milk feeder hopper (1), and the mixing pump (2) and circulation pump (3). The treated and hot water contained in any one of the tanks (4) is driven by means of the mixing pump (2) where the powdered milk is added gradually until the suitable proportion, of roughly 10%, is attained.

Next and after the milk has been reconstituted at one of these tanks (4), this milk is led to two deareator tanks (5), where the inevitable suspension air carried by the milk upon reconstitution is removed. These deareation tanks are provided with the relevant air removing vacuum pumps (6).

If skimmed liquid milk is used, the said reconstitution steps would not apply.

At the same time as the foregoing process, the hot emulsion vegetable oil tanks (7) will be observed.

To to improve the homogeneity of this water oil emulsion, it is first of all passed through a colloidal mill (18) that stabilises the emulsion to go on to a dispensing pump (19) that, as can be deduced from its own name, dispenses the necessary amount of fat to the milk: The suction and pulsation absorbers necessary for proper plant operation, and which require no further detail in this explanation, are shown at (20) and (21).

This fatty emulsion, injected into the milk at (8) and for such mixture to be as homogeneous as possible, is conveyed toward a first static mixer (9) with a labyrinthine structure and then to a dynamic mixer that shall be viewed in greater detail in a subsequent figure, for the dairy preparation to be a fully homogeneous mixture.

This hot dairy preparation leaving through the static and dynamic mixers is sent on to the standardisation tanks (11) where the product is standardised, and where the aforesaid stirrers (12) and (13) are shown, which comprise a temporary and rapid working stirrer and another slow and permanent stirrer that keeps the mixture homogeneous.

Once the dairy preparation leaves the standardisation tanks (11), it is led on to the storage tanks (14) that are also provided with the relevant stirrers, the temperature remaining at some 70° to 74° C., to be finally led to the upperizers (15) from where, following a sudden temperature rise up to 150° C. for three or four seconds, it is then sent on to the coolers before the packing stage, but that shall be seen in greater detail in a subsequent figure.

The previously treated processing water goes in at (16) and is used as first cooler of the dairy preparation, this processing water therefore being heated and stored at an isothermal tank (17) where it is kept at a temperature of roughly 70° C. to be subsequently used in the reconstitution process, as appropriate, of the powdered milk when sent to the reconstitution tanks (4).

Figure 2:
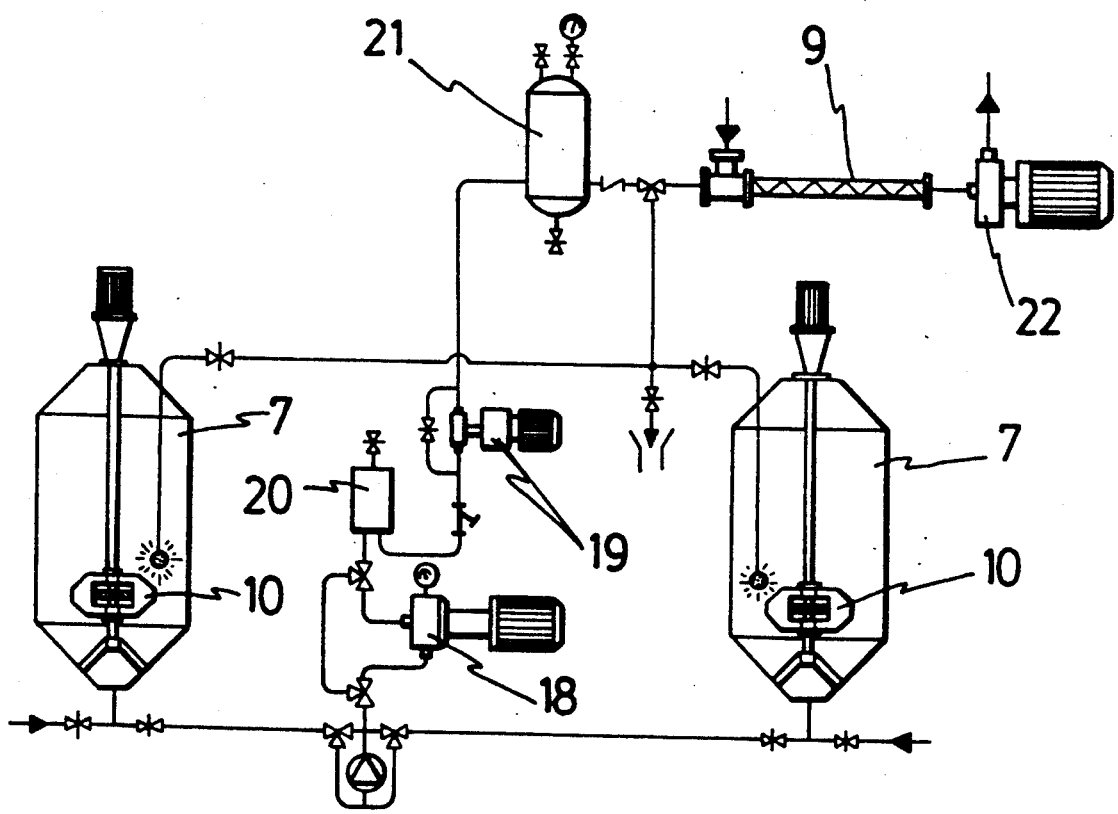
FIG. 2. Is the system to prepare and mix the vegetable fat.
Figure 3:
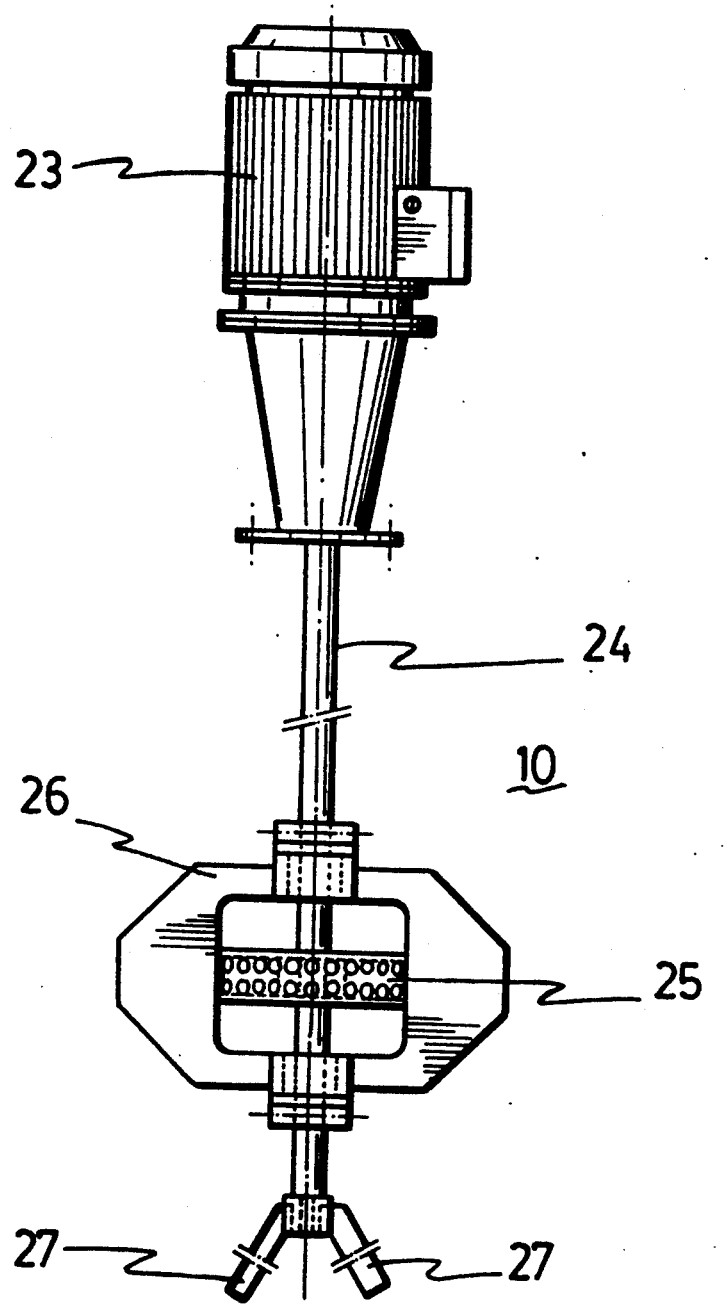
FIG. 3. Is the emulsifier stirrer provided at the water-oil mixing emulsion tank.

FIG. 2 shows the system for preparing and mixing the vegetable fat, comprising two emulsion tanks (7) with special stirrers (10), shown in greater detail in FIG. 3 attached hereto, that carry out this first mixture of hot water with the vegetable oil to subsequently pass the same through the colloidal mill (18) that stabilizes the hot water and oil mixture, which emulsion is then sent to the dispensing pump (19). Upon adding the vegetable fat, the dairy preparation is passed through a static (9) and dynamic (22) mixer that homogenizes the mixture even more.

The suction absorber can be seen at (20) and the pulsation absorber at (21), their practical contents going beyond the purpose of the invention.

FIG. 2 shows the stirrer-emulsifier (10) that was already shown inside the emulsion tank (7) of FIG. 2. This stirrer-emulsifier has a drive motor (23) that conveys its movement through a shaft (4) to four vanes (25) that provide the rapid emulsifying and stirring rotation and to three blades (26) for a slower rotation. The end of the shaft (24) rests upon a series of supports (27) for direct attachment to the emulsion tank.

Figure 4:
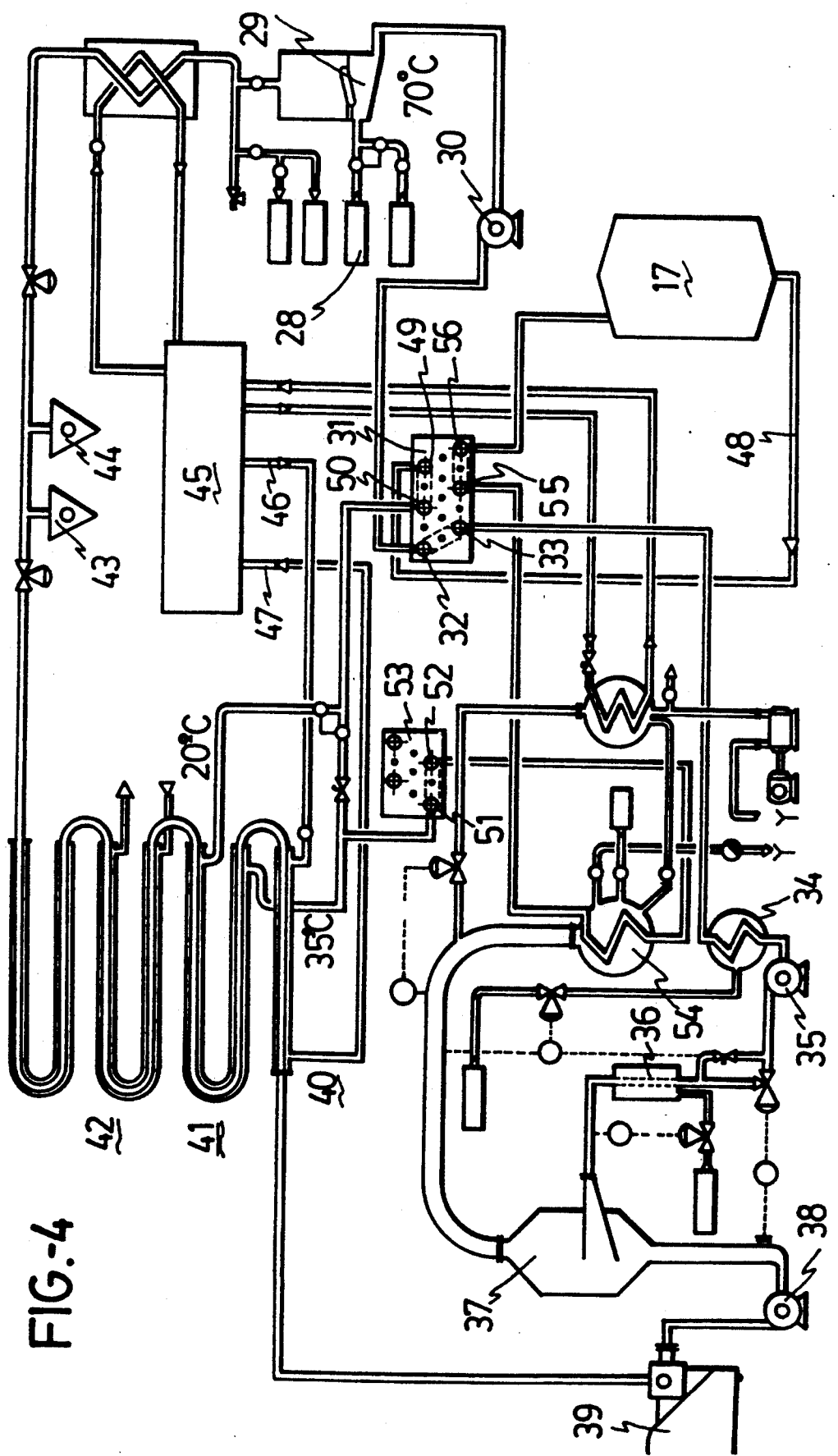
FIGS. 4 and 5. Show the upperization plant with the product going in, at 70° C. and 4° C. respectively.

FIG. 4 shows the upperization plant, which has been modified with a product inlet at 4° C. or at 70° C., which latter temperature is normally used for the product of this invention.

This possibility afforded by the plant hereof, allows that for any circumstance, the milk can be cooled down to a temperature of 4° C. to prevent the loss of the milk, which would no doubt happen if the latter were to remain at 70° C. for an extended period of time, for which purpose, and after cooling down to 4° C., the plant would be readapted to enable treatment of the milk at such temperature.

FIG. 4 itself shows plant adaptation for entry of the product at 70° C., through the conduit (28) to a first tank (29); from this tank it is driven by the impeller pump (30) to the plate (31) conduit (32), such hole (32) connecting with the lower conduit (33) that sends the product to the second pre-heater (34) that raises the dairy preparation's temperature from 70° C., at which it came from the conduit (28), to 78° C. With the assistance of an impeller pump (35) it introduces this dairy preparation into the upperization head (36) which manages to raise the temperature up to 150° C., then going on to the expansion tank (37) where its temperature suddenly goes down to 80° C., this dairy preparation then being sent on by means of another pump (38) to the homogenizer (39) that mechanically raises the dairy preparation temperature slightly to 83° or 84° C. This dairy preparation reaches the cooling stage through tubular coolers (40), (41) and (42) before the volumetric fillers (43) and (44) package the same preferably in tetra packs or any other system that can be suitably used.

As to the coolers (40), (41) and (42), the first one uses tower water (45), the second one processing water for cooling of the dairy product and therefore heating of the said water for reconstitution of the milk, whereas the third of such coolers uses ice-cold water to enhance cooling of the dairy preparation.

Thus, the water from the cooling tower (45) leaves the conduit (46) and goes into the exchanger, which comprises a concentric sheath with the passage of the dairy preparation, that leaves through the return conduit (47) to the cooling tower (45) for the process to begin once again. Furthermore, the processing water that needs to be kept at a temperature ranging between 75° and 85° C. for reconstitution of the powdered milk is stored in the isothermal tank (17).

From this isothermal tank (17), the processing water is guided through a conduit (48) to the hole (49) in plate (31), that connected to the hole (50) makes this water first of all go through the dairy product tubular cooler (41), this water being heated up to a temperature of roughly 35° C., which water leaves through the plate (53) conduits (51) and (52) to the first pre-heater (54), that raises the temperature thereof up to 70° or 72° C., to return through the plate (31) conduits (55) and (56) to the isothermal tank (17).

Finally, and whilst on the subject of the tubular coolers (40), (41) and (42), such coolers are structured as coils formed by a central tube throughout which runs the dairy preparation to be cooled down, concentrically covered by another tube through the internal space of which, limited by the internal tube, runs the cooling fluid, comprising tower water at cooler (40), processing water at cooler (41) and ice-cold water at cooler (42).

The temperature of the dairy preparation is lowered down to roughly 20° C. by means of such coolers, whereupon it would go into the volumetric fillers (43) and (44).

Figure 5:
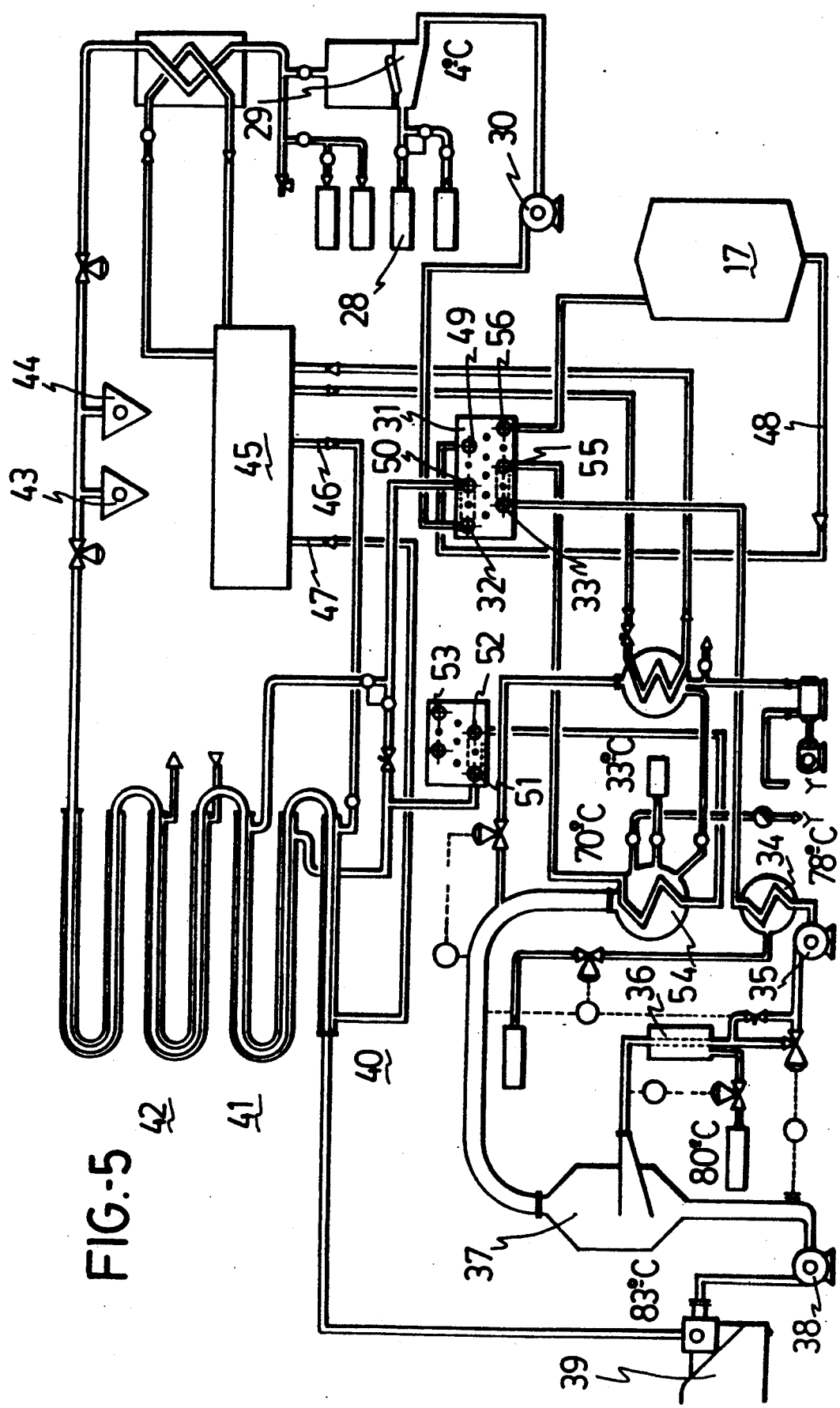

FIG. 5 shows the changes the plant requires when the dairy preparation, for any reason, is at 4° C. instead of 70° C., wherefore at (28) the dairy preparation will obviously be at the said 4° C.; this product at such temperature shall end up in plate (31) conduit (32) connected to conduit (5), will in the first instance be passed through the exchanger (41), going up to the conduit (51) that, in connection with (52) leads the product into the first pre-heater (56), guiding the same to the hole (55) that together with the conduit (33) shall send the same to the second pre-heater (34), whereupon the process described in the previous figure shall be repeated.

The first pre-heater (56) raises the temperature of the dairy preparation up to roughly 70° C., whereupon it shall go into the second pre-heater.

I claim:

1. Process of obtaining a dairy preparation comprising a homogeneous mixture of liquid skim milk and vegetable oil wherein a content of the oil does not exceed 4 g. per 100 ml. of the preparation and wherein the preparation is heated at a temperature of about 150° C. for no longer than four seconds before being packaged, the process comprising the steps of:
    obtaining liquid skim milk by reconstitution of powdered skim milk with hot water at a temperature of about 72° to 76° C.;
    heating up the liquid skim milk to a temperature of about 72° to 76° C.;
    obtaining a vegetable oil emulsion in hot water at a temperature of between 72° an 76° C.;
    dispensing said emulsion into the skim milk;
    homogeneously mixing the skim milk and vegetable oil emulsion in a static mixer and then in a dynamic mixer;
    standardizing the dairy preparation;
    storing the dairy preparation in storage tanks;
    dispensing vitamins into the dairy preparation;
    subjecting the dairy preparation to a sudden heating a temperature up to 150° C. for no longer than four seconds;
    and packaging the dairy preparation.

2. The process according to claim 1, wherein in said subjecting step, when a 70° C. heater inlet procedure is used, a processing water is used as an upstream coolant for the dairy preparation once it leaves a heater and a temperature of said processing water, which is at a room temperature, raising whereas, when the dairy preparation is made by means of a 4° C. inlet procedure, an actual dairy preparation is used as a coolant at a cooler.

3. The process according to claim 1, wherein vitamins A, D$_3$ and C are added to the dairy preparation when it is stored in said storage tanks.

4. The process according to claim 1, wherein said vegetable oil is selected from the group consisting of olive oil, sunflower oil rich in oleic acid, peanut oil and a mixture thereof.

5. The product obtained by the process according to claim 1.

* * * * *